United States Patent Office 3,472,739
Patented Oct. 14, 1969

3,472,739

PURIFICATION OF ALCOHOL BY CONTACT WITH ACID ACTIVATED CLAY AND DISTILLATION

William C. Ross and Nathan B. Martin, Jr., St. Albans, W. Va., assignors to Union Carbide Corporation, a corporation of New York No Drawing. Filed Jan. 5, 1967, Ser. No. 607,386
Int. Cl. B01d 3/34, 15/00
U.S. Cl. 203—36 3 Claims

ABSTRACT OF THE DISCLOSURE

It has been discovered that color-forming impurities that are present in higher alkanols can be converted to easily removable compositions by treating the impure higher alkanol with acid-activated montmorillonite clay. Apparently, the acid-activated clay catalyzes the conversion of the color-forming impurities to high molecular weight materials that are easily removed from the alkanol by fractional distillation. The treatment of the alkanol with the acid-activated clay is effected simply by contacting the impure alkanol with the clay, such as by passing the alkanol through a bed of the clay at ambient temperatures.

The invention relates to a process for purifying alcohols. In a particular aspect, the invention relates to a process for purifying higher alkanols which comprises contacting a higher alkanol with acid-activated montmorillonite clay for a period of time sufficient to convert color-forming impurities in the alkanol to easily removable, high boiling materials, followed by fractional distillation of the alkanol to separate said alkanol from the converted color-forming contaminants.

One of the principal utilities for high alkanols (that is, saturated aliphatic alcohols having from about 6 to 12 carbon atoms) is in the production of plasticizers for vinyl chloride polymers and other polymers. It is essential that an alcohol employed in producing a plasticizer have good color. Heretofore, plasticizer grade higher alkanols have been recovered from crude alkanol by fractional distillation. This process has proven to be rather inefficient because the color-forming impurities are difficult to separate from the alkanol. Thus, large quantities of lower grade alkanol is produced along with the premium plasticizer grade alkanol. It has been attempted to purify the alkanol by treatment with many types of chemical reactants that are generally known for their utility in improving color of materials. For example, treatment of n-butanol with sodium borohydride is found to substantially improve the color of the n-butanol. However, treatment of a higher alkanol with sodium borohydride is almost completely ineffective in improving the color. Other materials that have been tried for the purpose of attempting to improve the color of higher alkanols include triethylamine, dichloroethyl ether, phosphoric acid, phosphorous acid, oxalic acid, urea, hydrazine sulfate, sodium amide, a mixture of oxalic acid and hydrazine hydrate, hypophosphorous acid, bisphenol A, and the like. None of these materials were satisfactory for improving the color of higher alkanols either because the material is too expensive or because it was ineffective in improving the color, and, frequently, for a combination of the two reasons.

The present invention comprises a process wherein impure higher alkanol is first contacted with acid-activated montmorillonite clay for a period of time sufficient to convert color-forming impurities to higher boiling compositions, and then the thus treated higher alkanol is separated from the color-forming impurities by distillation. It has, of course, been known for years that acid-activated montmorillonite clay can be used to decolorize vegetable oils. The clay acted in these cases to absorb color-forming contaminants. However, in the present situation, the acid-activated montmorillonite clay is apparently not acting simply as an adsorbing agent. Rather, the clay is acting as a catalyst to convert the color forming impurities (which are usually olefins and/or carbonyl-containing materials) to higher boiling compositions that are readily separated from the alkanol by fractional distillation. Thus, if the alkanol is evaluated for color after being treated with the clay, but before being fractionally distilled, no improvement in color is noted. This is considered to be proof that the clay is not acting in the manner known to the prior art, that is, as an agent to adsorb the color-forming contaminants. Vapor phase chromatographic analyses of the higher alkanol, both before and after treatment with the acid-activated clay, reveals that the concentration of the original contaminant is substantially reduced by the treatment with the clay. However, the analyses shows the presence of at least two additional compounds in the alkanol after treatment with the clay. These two compounds are apparently formed from the original contaminant in a reaction that is catalyzed by the acid-activated clay.

The higher alkanols that are employed in the invention are those saturated aliphatic alcohols having from 6 to 12 carbon atoms. Specific illustrative examples of these higher alkanols includes hexanol, heptanol, 2-ethylhexanol and other octanols, nonanols, decanols, undecanols, dodecanols, and the like. The preferred higher alkanols are the octanols, particularly 2-ethylhexanol.

The higher alkanols that are employed in this invention are generally produced by either of two processes. The first is the well known OXO process wherein an olefin is converted to an aldehyde having one more carbon atom than the starting olefin. The aldehyde is then reduced to the alcohol by hydrogenation. The second process is an aldol condensation of an aldehyde with itself, for example, the aldol condensation of normal butyraldehyde to form 2-ethyl-3-propylacrolein. The resulting olefinic aldehyde is then hydrogenated to the alkanol. Both processes produce impurities containing unsaturation and/or carbonyl groups. The exact identity of the impurities is not known, but their presence shows up in the poor color as discussed herein. Whether or not the impurities produced by the two processes are identical is not known. However, the process of this invention purifies the alkanols from both processes.

The acid-activated montmorillonite clay that is employed in the invention is a well known material. The clay is produced by granulating montmorillonite clay to a rather fine particle size, for example, 20–60 mesh, treating with concentrated sulfuric acid, and then roasting. Most montmorillonite clays are substances that have the following chemical formula:

$$Mg \cdot Ca(O) \cdot Al_2O_3 \cdot SiO_2\ (H_2O)_n$$

wherein $n$ is a positive whole number.

As pointed out above, the nature and production of acid-activated montmorillonite clay are well known in the art.

The first step in the invention comprises contacting the higher alkanol with the clay. This can be done by following conventional filtration procedures wherein the alkanol is passed through a bed of the montmorillonite clay. The alkanol is kept in contact with the clay for a period of time sufficient to convert the color-forming impurities to higher boiling materials that are readily separated from the alkanol by fractional distillation. This contact time is not narrowly critical, and can vary from about 10 to about 60 minutes. It is preferred that the temperature of the alkanol and the bed of acid-activated clay be at about room temperature, or slightly elevated temperature up to, for example, about 50° C. While higher or lower temperatures can be employed, if desired, the chance of undesirable side reactions becomes greater as the temperature is increased over about 50° C., and the catalytic activity of the acid-activated clay begins to become uneconomically slow as the temperature is reduced below about 15° C. The highest temperature that can be employed is that where significant dehydration of the alkanol to an olefin occurs. With octanols, for example, this temperature is about 145° C.

The next step in the process of the invention is to distill the alkanol that has been contacted with the acid-activated clay. Conventional distillation procedures can be employed here, with the purified alkanol being recovered as a distillate, and the color-forming impurities being removed as distillation residue.

The alkanols that are purified by the process of the invention have enhanced utility in the production of plasticizers, for example, dialkyl phthalates, and the like.

The examples below illustrate the invention.

In the examples, the acid-activated montmorillonite clay was Grade 24 Filtrol, an acid-activated clay having a particle size in the 20 to 60 mesh range. The special sulfuric acid test employed to evaluate the color of the alcohol is as follows:

SULFURIC ACID TEST

Note. All glassware must be quantitatively clean and free of acetone vapors prior to use.

(a) Transfer 100-ml. of the sample measured from a graduate to a 250-ml. glass-stoppered Erlenmeyer flask.

(b) From an automatic buret add *dropwise* 8 ml. of fresh, colorless concentrated C.P. sulfuric acid having a purity of 96.5±0.5 percent. *Swirl the contents of the flask constantly by hand during the addition of the acid. It is imperative that the swirling be constant and vigorous.* When a new bottle of sulfuric acid is placed in use, its quality should be checked against a previously analyzed sample of alcohol.

(c) Cover the flask by means of an inverted 50-ml. beaker and place in a water bath maintained at 98±2° C. for exactly 60 minutes. Maintain sufficient water in the bath to cover completely the liquid in the flask but not enough to touch the beaker cover on the flask.

(d) Remove the flask from the bath and rapidly cool to approximately 70° C. with cold tap-water.

(e) Transfer the liquid to one of two 100-ml. matched tallform Nessler tubes.

(f) Fill the second tube to the mark with a platinum-cobalt standard representing the approximate color of the solution.

(g) Compare the colors of the solution and standard by viewing vertically down through the tubes against a white background.

(h) Determine the exact color of the solution by successive replacement of the standard in the second tube until an exact match is obtained.

EXAMPLE 1

Crude stripped (lights-free) 2-ethylhexanol which was derived from butyraldehyde condensation was preheated to 700° C. and fed to a 32×100 mm. bed of Grade 24 Filtrol at a rate of one bed-volume per hour. The bed was maintained at the desired temperature by vaporizing a liquid of suitable boiling point through an outer chamber of the bed column. The effluent from the column was then distilled into several fractions on a 13-ETP still at 50 mm. Hg abs. at a 5:1 reflux ratio. The fractions were then subjected to the special sulfuric acid test. The experimental results at 118° C. and at 148° C. are summarized in the following table, as compared to those of control distillations on untreated samples.

| | | Special $H_2SO_4$ Test Color, °Pt-Co [1] | | | |
|---|---|---|---|---|---|
| | | | | Controls | |
| Fraction | Percent of charge | 118° C. | 148° C. | (Distillation only—duplicate runs) | |
| Heads | 13 | | | | |
| 1 | 17 | 26 | 82 | 115 | 150 |
| 2 | 17 | 16 | 28 | 90 | 120 |
| 3 | 17 | 9 | 25 | 160 | 160 |
| 4 | 17 | 40 | 32 | 100 | 240 |

[1] In the Pt-Co test, a lower number signifies a lighter sample color.

EXAMPLE 2

In this example, a number of experiments were made with crude stripped 2-ethylhexanol in order to determine the optimum temperatures and feed rates for the Filtrol treatment. The results were as follows:

A. EFFECT OF TEMPERATURE (1 BED-VOLUME/HOUR)

| Experiment No. | Temp., ° C. | Hearts fraction—special $H_2SO_4$ test color, °Pt-Co |
|---|---|---|
| Control | (1) | 200 |
| 1 | 35 | 18 |
| 2 | 118 | 50 |
| 3 | 148 | (2) |

[1] Not treated.
[2] Dehydration of alcohol occurred.

B. EFFECT OF FEED RATE (AT 35° C.)

| Experiment No. | Feed rate, bed-vol./hr. | Hearts fraction special $H_2SO_4$ test color, ° Pt-Co |
|---|---|---|
| 4 | 1 | 18 |
| 5 | 6 | 23 |
| 6 | 10 | 27 |

EXAMPLE 3

A sample of regular grade refined 2-ethylhexanol ($H_2SO_4$ color=57 Pt-Co) was treated with Grade 24 Filtrol at 25° C. at a rate of 5 bed-volumes/hour. The treated product was subjected to a simple evaporation through a gooseneck instead of the more efficient distillation employed with the crude samples. The sulfuric acid test colors were as follows:

| $H_2SO_4$ color: | Pt-Co |
|---|---|
| Original sample | 57 |
| Treated, but not evaporated | 62 |
| Treated and evaporated | 19 |
| (Control) untreated-evaporated only | 57 |

EXAMPLE 4

Representative samples of OXO process 2-ethylhexanol (EHOH) were treated with Grade 24 Filtrol and distilled under the conditions employed in Example 3. The results were as follows:

| Sample: | Special $H_2SO_4$ test color, Pt-Co |
|---|---|
| (1) Refined EHOH: | |
| As received | 50 |
| Redistilled | 11 |
| Treated and redistilled | 5 |
| (2) Forecolumn tails (crude stripped EHOH): | |
| As received | (1) |
| Redistilled | 190 |
| Treated and redistilled (duplicate runs) | 80, 130 |

[1] Not determined (sample too dark).

What is claimed is:

1. A process for purifying alkanol of from 6 to 12 carbon atoms which comprises the steps of:

(a) contacting an alkanol of from 6 to 12 carbon atoms with acid-activated montmorillonite clay for a period of time and at a temperature sufficient to convert color-forming impurities, said impurities being carbonyl-containing compounds, olefinic compounds, or mixtures thereof to compositions that have significantly higher boiling points than said alkanol, and (b) separating said alkanol from said compositions by fractional distillation.

2. The process of claim 1 wherein said process is carried out at a temperature in the range of from about 15° to about 50° C.

3. The process of claim 1 wherein said alkanol is 2-ethylhexanol.

References Cited

UNITED STATES PATENTS

| | | | |
|---|---|---|---|
| 2,472,912 | 6/1949 | McCarter | 260—643 |
| 2,629,686 | 2/1953 | Grosser | 260—643 |
| 2,647,150 | 7/1953 | Askevold | 260—643 |
| 2,850,549 | 9/1958 | Ray | 260—643 |
| 2,857,436 | 10/1958 | Mackinder et al. | 260—643 |
| 2,904,520 | 9/1959 | Donovan et al. | 252—450 |
| 2,943,105 | 6/1960 | Caruthers | 260—643 |
| 2,965,680 | 12/1960 | Andersen et al. | 260—643 |

WILBUR L. BASCOMB, Jr., Primary Examiner

U.S. Cl. X.R.

203—41, 50; 252—450; 260—643